United States Patent
Boebel

(10) Patent No.: US 7,659,699 B2
(45) Date of Patent: Feb. 9, 2010

(54) BATTERY

(75) Inventor: Friedrich Boebel, Eurasburg (DE)

(73) Assignee: Torqeedo GmbH, Starnberg (DE)

( * ) Notice: Subject to any disclaimer, the term of this patent is extended or adjusted under 35 U.S.C. 154(b) by 367 days.

(21) Appl. No.: 11/625,439

(22) Filed: Jan. 22, 2007

(65) Prior Publication Data

US 2007/0182371 A1   Aug. 9, 2007

(30) Foreign Application Priority Data

Jan. 20, 2006   (DE)   ............... 10 2006 003 114
Mar. 31, 2006   (EP)   ............................. 06006817

(51) Int. Cl.
*H02J 7/00* (2006.01)

(52) U.S. Cl. .................... 320/136; 320/112

(58) Field of Classification Search .............. 320/106, 320/107, 110, 111, 112, 113, 114, 116, 120, 320/121, 122, 134, 135, 136; 429/21, 22, 429/92, 93, 97, 99
See application file for complete search history.

(56) References Cited

U.S. PATENT DOCUMENTS 4,972,135 A  *  11/1990  Bates et al. ............. 320/105
6,329,796 B1 *  12/2001  Popescu ................... 320/134
6,331,764 B1    12/2001  Oglesbee et al.
6,804,098 B2 *  10/2004  Pannwitz ................... 361/90
2006/0186857 A1* 8/2006  Matty et al. .............. 320/122

FOREIGN PATENT DOCUMENTS

| DE | 44 23 199 A1 | 1/1995 |
| EP | 0 661 769 A2 | 7/1995 |
| EP | 1 681 753 A1 | 7/2006 |
| GB | 2 279 802 A | 1/1995 |
| WO | WO 2005/046017 A1 | 5/2005 |

OTHER PUBLICATIONS

European Search Report dated Aug. 11, 2006 with English translation of relevent portion (eight (8) pages).

* cited by examiner

*Primary Examiner*—Edward Tso
*Assistant Examiner*—M'baye Diao
(74) *Attorney, Agent, or Firm*—Crowell & Moring LLP

(57) ABSTRACT

A battery with at least one battery cell has two battery poles and current-conducting connections between the battery cells and the battery poles. A safety switching encompasses a current-limiting element in the connection between the battery cells and one of the battery poles. A switch is parallel to the current-limiting element and a control device closes the switch, if the current between the battery cells and the battery poles falls below a predetermined threshold minimum current.

15 Claims, 1 Drawing Sheet

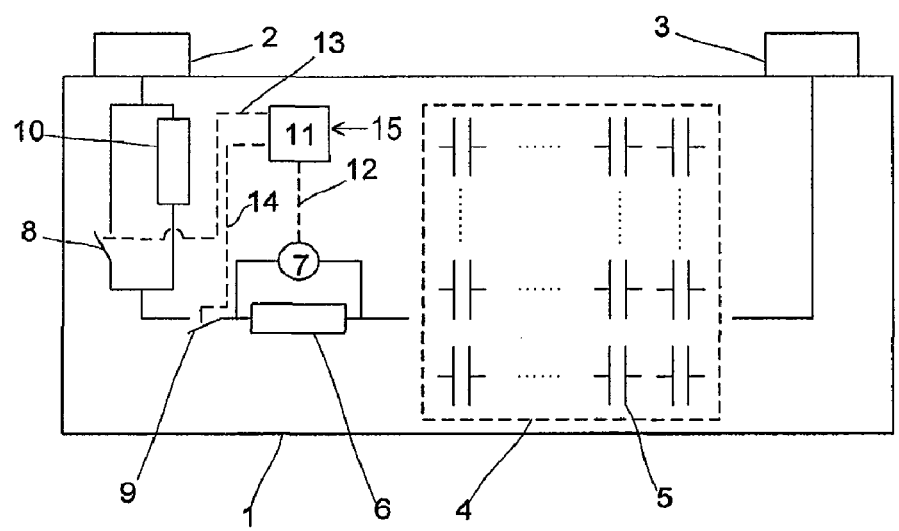

BATTERY

CROSS REFERENCE TO RELATED APPLICATIONS

This application claims priority to German Patent Application No. DE102006003114.8, filed Jan. 20, 2006, and European Patent Application No. EP06006817.8, filed Mar. 31, 2006, the disclosures of each of which are incorporated herein by reference in their entirety.

BACKGROUND AND SUMMARY OF THE INVENTION

The present invention relates to a battery with at least one battery cell, comprising two battery poles and current-conducting connections between the battery cell(s) and the battery poles.

For example, a lithium-manganese cell has a capacity of 1.6 Ah at a rated voltage of 3.7 V. Depending on the field of application, a plurality of lithium-manganese cells must thus in practice be interconnected to a battery in parallel or in series, to achieve a desired nominal voltage at the battery poles and a desired capacity.

Lithium-manganese batteries are particularly resistant against high currents. That is, they can also provide high currents without causing the battery voltage to break down. Electrochemically, lithium-manganese batteries react in a relatively slow manner so that, even with error functions, critical temperature increases do not occur, which in other lithium-ion rechargeable batteries could, to some extent, lead to safety problems. Generally, lithium-manganese batteries are thus safe.

The battery voltage is, however, dependent on the charge state of the battery. That is, with an increasing discharge of the battery, the battery voltage slowly decreases. If two batteries, which in each case consist of a plurality of lithium-manganese cells, that are charged to varying degrees and consequently have different terminal voltages, are connected in parallel, an equalizing current flows between the batteries.

Lithium-manganese batteries have a very low internal resistance of approximately 1 mohm. If, in the above-mentioned parallel connection of two batteries, their battery voltages differ by 10 volts, for example, an equalizing current of 10,000 A flows, which can represent a high risk potential, due to the very low internal resistance.

Presently, batteries with high current-capable lithium cells, which are to be interconnected with batteries of the same type, are thus concisely brought into a defined charge state by way of special battery chargers so that no or only very little equalizing current flows in response to a connection of two such batteries. The charging of the batteries thus becomes very complex and can only be carried out by experts.

Furthermore, for safety reasons, such high current-capable batteries can presently not be sold to end users as a separate module because, for example, it cannot be ruled out that the end user improperly interconnects two batteries, that are charged to varying degrees.

DE 44 23 199 A1 describes a battery package with internal batteries and external battery poles for connecting a consumer load, and having a control switch, that connects the battery poles with the internal batteries only if a consumer load is connected to the battery poles. The proper connection of a consumer load to the battery poles is determined via a separate signal input at the battery package.

An object of the present invention is thus based on limiting the equalizing currents in response to the interconnection of two or more batteries.

In particular, an object of the present invention to develop a battery, that encompasses a plurality of high current-capable lithium cells, without the above-mentioned problems.

This object has been solved with a battery with at least one battery cell, having two battery poles and current-conducting connections between the battery cell(s) and the battery poles. Provision is made for a safety switching, which encompasses a current-limiting element in the connection between the battery cells and one of the battery poles. A switch is disposed parallel to the current-limiting element, and provision is made for a control device, which closes the switch, if the current, flowing between the battery cells and one of the battery poles, falls below a predetermined minimum current.

The battery of the present invention represents a direct current supply, which satisfies all necessary safety requirements. The safety switching of the present invention ensures that no safety-critical situations whatsoever occur, even in response to a faulty operation. Generally, a layperson can thus also connect the battery to a current consumer. The present invention is thus the first to make possible selling a lithium-based high-performance battery as a separate module, that is to say, not fixedly connected with a current consumer, to an end user as well.

According to the invention, the battery includes a safety switching which comprises a switch in the connection between the battery cells and one of the battery poles. Parallel to the switch there is disposed a current-limiting element. In general, the switch will be a semiconductor switch or transistor, preferably a field effect transistor, such as a MOSFET.

Without the safety switching as provided in the present invention, the above-mentioned high equalizing currents can occur in response to an inappropriate parallel connection of two lithium-based batteries. To prevent too high equalizing currents, a current-limiting element, which is disposed between the battery cell(s) and one of the battery poles, is provided in the safety switching, and the switch disposed parallel to the current-limiting element is open.

If a battery equipped in such a manner is connected to a second battery with a different terminal voltage, an equalizing current flows across the current-limiting element. Only when the equalizing current falls below a predetermined threshold minimum current, the safety switching causes the switch disposed parallel to the current-limiting element to close, such that the current flows across the closed switch and bypasses the current-limiting element.

If an ohmic resistance in the magnitude of 100 ohm is chosen as the current-limiting element, for example, a non-critical current of 100 mA flows with a voltage difference of 10 Volts. Without this resistance, an equalizing current of 10000 A, which would only be limited by the internal resistance of the battery of approximately 1 mohm, would flow in response to a closed switch.

The term "current-limiting element" will, hereinbelow, refer to active or passive electric or electronic components, which limit the time average of the current, which flows from the battery to one of the battery poles. This can occur, in particular, in that an ohmic resistor is used as current-limiting element or in that the time-averaged current, which only intermittently permits the current flow, is limited by way of a pulse generator. In the latter case, the maximum current can be adjusted via the pulse width and/or via the pulse repetition rate.

To simplify matters, in the following description an ohmic resistance is used as the current-limiting element. But a person skilled in the art will recognize that instead of using an ohmic resistance a pulse generator or any other electric or electronic device which allows the current to flow only intermittently can be used.

For safety reasons it is further advantageous to provide a main switch that is able to interrupt the connection between the battery cells and one of the battery poles, preferably the positive pole. The main switch is either disposed in series with the parallel circuit of the switch and the resistor or within the parallel circuit in series with the resistor. The main switch can preferably be operated manually as well as automatically.

In response to an undercutting of a certain voltage, some battery cells, for example lithium cells, can be destroyed. Advantageously, the voltage applied between the battery poles is thus monitored and the current-conducting connection between at least one of the battery poles and the battery cells is interrupted in response to an undercutting of a certain value. In case the battery of the present invention is provided with a main switch the main switch is opened to completely disconnect the positive battery pole from the battery cell(s).

The present invention is suitable for batteries with high current-capable battery cells, in particular lithium cells. Preferably, lithium-manganese cells are provided in the battery. Lithium-manganese cells have a very high energy density so that a desired battery capacity can be realized with a minimal battery volume and with a minimal battery weight. As compared to other lithium-based battery systems, lithium-manganese batteries fulfill considerably higher safety standards. In connection with the safety switching as claimed in the invention, the invention thus provides a safe high-performance battery module.

Preferably, the safety switching includes a measuring device for current measurement, that cooperates with the control device via an input signal line. Also preferably, the measuring device is integrated in the battery and is connected so that it measures a current, to permit conclusions regarding the current flowing across the battery poles, in particular a current, that is proportional to the current flowing across the battery poles. The measured current is transmitted via the input signal line to the control device which activates the switch and/or the main switch as a function of this input signal. When open, the main switch interrupts the current-conducting connection between the battery cells and at least one of the battery poles, preferably the positive pole, while, when closed, it permits the current flow.

Advantageously, the safety switching also comprises a measuring device for measuring the battery voltage, which is analogously connected with the control device, so that the switch and/or the main switch can also be activated and opened or closed, if predetermined threshold voltages are exceeded or undercut.

In a currently preferred embodiment, the current flowing across the battery poles, in practice across the positive pole of the battery, is constantly measured. This can be carried out, for example, in that a current measuring resistor, a so-called shunt, is connected into the line between the battery cells and the positive pole and in that the voltage drop across this resistor is measured.

If a predetermined maximum current is exceeded in response to this voltage drop measurement, the current-conducting connection between at least one of the battery poles, generally the positive pole, and the battery cells is interrupted. Preferably, this can occur in that the main switch, which is disposed in this current-conducting connection line, is opened. The current flow is interrupted thereby.

Advantageously, the measuring device can accommodate, in addition to the current, that flows across the battery poles, the battery voltage. In response to an exceeding or undercutting of a certain predetermined voltage, the switch and/or the main switch are, in this case, also activated and opened by the control device so that the current flow is interrupted.

It is thus advantageous, for example, to measure the voltage applied between the battery poles and, in response to a predetermined voltage being exceeded, to interrupt the current-conducting connection between at least one of the battery poles, generally the positive pole and the battery cells. For example, with the use of lithium-manganese cells, the current flow is advantageously interrupted, if the voltage exceeds a value that corresponds to the number of lithium-manganese cells connected in series multiplied by 4.2 V to prevent an overcharging of the battery.

In response to an undercutting of a certain voltage, some battery cells, for example lithium cells, can be destroyed. Advantageously, the voltage applied between the battery poles is thus monitored and the current-conducting connection between at least one of the battery poles and the battery cells is interrupted in response to an undercutting of a certain value. For batteries with lithium-manganese cells, it has proven itself of value to open the main switch, if the voltage per cell undercuts a value of 2 volts. If, for example, seven (7) lithium-manganese cells are each connected in series to achieve a rated voltage of 7×3.7 V=25.9 V, a voltage lower limit of 7×2 V=14 V is defined. If the terminal voltage of the battery falls below this value, the main switch is automatically opened.

The present invention provides advantages, in particular with freely accessible batteries, i.e., batteries, that are not fixedly installed in a certain arrangement or device. With such batteries, there exists a danger that the user may also connect consumer loads to the battery, for which the battery is not designed, or that the user connects the battery to another battery in parallel.

Without the safety features as provided by the present invention, very high currents can flow unintentionally, in particular with lithium-based batteries, for example batteries with lithium-manganese cells. The present invention provides enormous safety advantages, in particular with batteries that have a capacity of more than 200 Wh and more. With large batteries having capacities of more than 500 Wh, preferably more than 1000 Wh, these advantages are of considerable importance. Preferably, the present invention is used for batteries encompassing between 4 and 12 lithium-manganese cells connected in series and more than 10 lithium-manganese cells connected in parallel.

The battery of the present invention is particularly suitable for supplying power to electric boat motors. In particular, with limited volume and weight in a boat, the high energy density of lithium batteries is a crucial advantage. If the electric motor is only used as an auxiliary motor or only for specific trips, the battery of the present invention can easily be assembled or disassembled by a layperson. As a supply system for electric boat motors, the present invention achieves the advantages of lithium batteries, namely high energy density, high current resistance, high charge stability even for a longer storage, improved performance at low temperatures, and high safety standards with the use of lithium-manganese batteries. In addition, the battery of the present invention enables a simple and safe assembly and disassembly of the battery, even by non-experts. This is advantageous, in particular, for the use of such a battery for the current supply of a boat auxiliary drive.

Furthermore, the present invention provides protection against an inappropriate series connection of two lithium batteries. If a fully charged lithium-manganese battery cell with a terminal voltage of 4.2 V is connected in series with an only partly charged lithium-manganese cell with a terminal voltage of, e.g., only 2 V, and a consumer load is connected, the only partly charged cell can discharge until it self-destructs. The terminal voltage of the battery is thus monitored and the current-conducting connection between the lithium cells and the battery pole is interrupted, if the terminal voltage decreases too greatly and a destruction of the battery is imminent.

With a series connection of two unevenly charged batteries as in the present invention, the current flow is thus interrupted in time, before the lithium cells of one of the batteries are damaged. If applicable, the discharged battery can be disconnected and the electric consumer load supplied with only one battery.

BRIEF DESCRIPTION OF THE DRAWING

Other objects, advantages and novel features of the present invention will become apparent from the following detailed description of the invention when considered in conjunction with the accompanying drawings, in which:

The sole FIGURE is a schematic diagram of a battery accordingly to the present invention.

DETAILED DESCRIPTION OF THE DRAWING

The FIGURE shows a battery 1 with a positive pole 2 and a negative pole 3. The battery 1 comprises a cell block 4 with lithium-manganese cells 5, that are partly connected in series and partly connected in parallel.

A safety switching is provided between the cell block 4 with the lithium-manganese cells 5 and the positive pole 2. For this purpose, a measuring device 7 is connected in parallel to the resistor 6 to measure the voltage drop across the resistor 6 which is proportional to the current, flowing through the resistor 6.

Connected in series with the resistor 6 are a main switch 9 and a switch 8 to which a resistor 10 is connected in parallel. The parallel connection consisting of the switch 8 and the resistor 10 is connected to the positive pole 2. A transistor, in particular a MOSFET, is used as switch 8. Main switch 9 can be activated manually as well as by controller 11.

Furthermore, a controller 11, receives, as an input signal 12, the voltage drop determined by the measuring device 7. The controller 11 can activate the switch 8 via a signal line 13 as well as can activate the main switch 9 via a signal line 14.

Switch 8 and main switch 9 are coupled to each other such that switch 8 always opens when main switch 9 is opened. When battery 1 is disconnected from any electric consumer switch 8 and main switch 9 are open.

After an electric consumer has been connected to the battery 1, main switch 9 is closed. As long as the consumer, for example an electric motor, is in the switched-off-state there should not flow any current across resistor 6. This is checked by controller 11 which receives an input signal from measuring device 7. If the current flowing across resistor 6 is below a predetermined threshold minimum current, controller 11 transmits a signal to switch 8 and activates switch 8 to close and thus to by-pass resistor 10.

If a current flows across resistor 6 which exceeds the predetermined threshold, then minimum current switch 8 remains closed. This can be the case if two differently charged batteries with different terminal voltages are connected in parallel and an equalizing current flows across the current-limiting resistor 10. Only if the equalizing current falls below the predetermined threshold minimum current switch 8 will be closed.

The controller 11 constantly monitors the current released by the battery 1 via the voltage drop over the resistor 6. As long as this current does not exceed a predetermined maximum value, the controller 11 transmits a signal to main switch 9, so as to keep the switch 8 in the "closed" position. Thereby, in normal operation, the current can flow unhindered to the positive pole 2 via main switch 9 and the closed switch 8.

If the controller 11 determines that the value predetermined for the current is exceeded, the signal "open" is transmitted to the main switch 9 and the current flow is interrupted.

Furthermore, the controller 11 has an input 15, to which a non-illustrated measuring device (not shown) for measuring the terminal voltage of the battery 1 is connected. If the terminal voltage exceeds or falls below predetermined threshold values, the controller 11 activates the switch 8 and/or the main switch 9, so as to open or close these switches, as necessary.

In the following, the different functions of the safety switching as provided by the present invention will be explained, using a battery 1 composed of lithium-manganese cells 5 with a 37 V rated voltage and a capacity of 58 Ah. In the battery 1, ten (10) such lithium-manganese cells 5 are connected in series and thirty-six (36) cells 5 are connected in parallel. The charge end voltage of this battery is 42 V.

In response to a charging of the battery 1, the charging device is connected to the poles 2, 3, and the charging process is then started. In this phase, the switch 8 is closed so that the charge current can flow across the cells 4. Via the input 15, the controller 11 constantly detects the current terminal voltage of the battery 1. If the charge end voltage of 42 V is reached, the controller 11 transmits a signal to the switch 8 and main switch 9 so that they are opened and the charge process is thus terminated.

During normal operation, a current consumer is connected to the poles 2, 3 of the battery 1. With an increasing discharge of the battery 1, its terminal voltage falls as well. The terminal voltage, in turn, is monitored by the controller 11. If the voltage falls below 20 V, that is, the voltage of the individual cells 4 undercuts 2.0 V, the switches 8 and 9 are opened and the battery 1 is thereby disconnected so as to prevent a damaging of the cells 4.

If, in partially discharged state, the battery 1 is inappropriately connected in parallel with a fully charged battery of the same type, an equalizing current flows, due to the different terminal voltage of both batteries, after having closed the main switch 9. For example, the battery 1 could encompass a terminal voltage of 27 V, while the other battery, in its charged state, has the rated voltage of 37 V. Without the safety switching of the present invention, an equalizing current of up to 10,000 A could flow in this situation, because the internal resistance of the batteries is only approximately 1 mohm.

As outlined above, switch 8 is open in this situation. Thus, the equalizing current flows across resistor 10. Resistor 10 has a resistance of 100 ohm, for example, thus limiting the equalizing current to 100 mA. Only if the equalizing current has fallen below the predetermined minimum current switch 8 will be activated to close, thus bridging resistor 10.

The foregoing disclosure has been set forth to merely illustrate the invention and is not intended to be limiting. Since modification of the disclosed embodiments incorporating the spirit and substance of the invention may occur to persons skilled in the art, the invention should be construed to include everything within the scope of the appended claims and equivalents thereof.

The invention claimed is:

1. A battery with at least one battery cell, comprising two battery poles, current-conducting connections between the at least one battery cell and the battery poles, and a safety switching arrangement which includes a current-limiting element in one of the connections between the at least one battery cell and at least one of the battery poles to limit a current that flows during battery discharge to a predetermined threshold current, a switch disposed in parallel to the current-limiting element that is open when the flowing current is above the predetermined threshold current, and a control device arranged to close the switch, if the current that flows between the at least one battery cell and the battery poles falls below a predetermined threshold minimum current.

2. The battery according to claim 1, wherein a main switch is provided in one of the current conducting connections between the at least one battery cell and one of the battery poles.

3. The battery according to claim 2, wherein the control device is operative to open the main switch and the switch, if the current flowing between the at least one battery cell and one of the battery poles exceeds a predetermined maximum current.

4. The battery according to claim 2, wherein the switch and the main switch are operatively associated so that the switch opens if the main switch is opened.

5. The battery according to claim 4, wherein the control device is operative to open the main switch and the switch, if the current flowing between the at least one battery cell and one of the battery poles exceeds a predetermined maximum current.

6. The battery according to claim 1, wherein the at least one battery cell is a lithium cell.

7. The battery according to claim 6, wherein the at least one lithium cell is a lithium-manganese cell.

8. The battery according to claim 1, where the at least one battery cell comprises a plurality of battery cells connected in at least one of series and parallel.

9. The battery according to claim 8, wherein the battery cells are lithium-manganese cells.

10. The battery according to claim 6, wherein at least one of between four and twelve lithium-manganese cells are connected in series and more than ten lithium-manganese cells are connected in parallel.

11. The battery according to claim 1, wherein the safety switching arrangement comprises a device for at least one of current and voltage measurement.

12. The battery according to claim 11, wherein at least one of the switch and the main switch is disposed in one of the connections between the positive pole of the battery and the at least one battery cells.

13. Method for using the battery according to claim 1, comprising using the battery as a current supply for an electric boat.

14. Method according to claim 13, wherein the at least one battery cell is a lithium cell.

15. Method according to claim 14, wherein the at least one lithium cell is a lithium-manganese cell.

* * * * *

UNITED STATES PATENT AND TRADEMARK OFFICE
CERTIFICATE OF CORRECTION

PATENT NO.       : 7,659,699 B2                                   Page 1 of 1
APPLICATION NO.  : 11/625439
DATED            : February 9, 2010
INVENTOR(S)      : Friedrich Boebel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this

Eighteenth Day of January, 2011

David J. Kappos
*Director of the United States Patent and Trademark Office*